United States Patent [19]
Glück et al.

[11] Patent Number: 5,908,872
[45] Date of Patent: Jun. 1, 1999

[54] PRODUCTION OF EXPANDABLE STYRENE POLYMERS

[76] Inventors: Guiscard Glück, An den Mühlwegen 11, 55129 Mainz; Klaus Hahn, Im Bügen 9, 67281 Kirchheim; Achim Löffler, Schwarzwaldstr.26, 76137 Karlsruhe; Maria Lorenz, Oberer Waldweg 20, 67281 Kirchheim, all of Germany

[21] Appl. No.: 09/174,163

[22] Filed: Oct. 16, 1998

[30] Foreign Application Priority Data

Nov. 10, 1997 [DE] Germany ................ 197 49 570

[51] Int. Cl.⁶ .................................................. C08J 9/20
[52] U.S. Cl. ........................... 521/146; 521/56; 521/96; 521/114

[58] Field of Search ............................ 521/56, 96, 114, 521/146

[56] References Cited

U.S. PATENT DOCUMENTS 5,177,115  1/1993  Hintz .......................... 521/56
5,266,603  11/1993  Holtzmeier ................... 521/56

*Primary Examiner*—Morton Foelak
*Attorney, Agent, or Firm*—James J. Drake

[57] ABSTRACT

In a process for producing expandable styrene polymers containing graphite particles by polymerization of styrene in aqueous suspension in the presence of two peroxides which decompose at different temperatures, the peroxide which decomposes at lower temperature is multifunctional and on decomposition forms two or more linked polymer chains.

8 Claims, No Drawings

PRODUCTION OF EXPANDABLE STYRENE POLYMERS

The present invention relates to an improved process for producing expandable styrene polymers (EPS).

The suspension polymerization of styrene to produce EPS is usually carried out as a batchwise process with a rising temperature profile. Polymerization initiators used are peroxides having different half-life periods. Use is usually made of dibenzoyl peroxide during the first stage of the polymerization at from about 80 to 90° C. and of a higher-decomposing peroxide such as tert-butyl perbenzoate or dicumyl peroxide during the second stage of the polymerization at from about 105 to 130° C. This procedure makes it possible to obtain EPS having low residual monomer contents. The use of peroxides having different half-life periods as a function of temperature allows controlled removal of the heat of reaction over the entire process. This is particularly important for large reaction vessels, as are employed in industrial production, which have an unfavorable volume/surface area ratio for heat removal.

The molar amount of peroxides in the reaction mixture allows the number of reaction centers and accordingly also the conversion, which is proportional to the number of these, to be controlled. However, the concentration of conventional monofunctional peroxides (eg. dibenzoyl peroxide) cannot be simply increased to achieve an increased conversion without far-reaching consequences. This would necessarily result in the formation of more polymer chains during the reaction which would lead to comparatively low viscosities of the fully polymerized product. In the case of such products, it is known, however, that neither the processing properties (eg. conglutination) nor the properties of the foams produced therefrom (low mechanical strength) are acceptable.

It is an object of the present invention to increase the conversion in the suspension polymerization for producing EPS without this leading to impairment of the properties.

We have found that this object is achieved by using a multifunctional peroxide as peroxide A which decomposes at the lower temperature.

The present invention accordingly provides a process for producing expandable styrene polymers in which styrene, if desired together with up to 20% of its weight of comonomers, is polymerized in aqueous suspension in the presence of at least two organic peroxides A and B which decompose at different temperatures, where the peroxide A has a half-life period of 1 hour at from 80° C. to 100° C. and the peroxide B has a half-life period of 1 hour at from 110° C. to 150° C. In this process, the peroxide A which decomposes at lower temperature is multifunctional and on decomposition initiates two or more linked polymer chains and the molar ratio B:A of the peroxides is greater than 40:60.

These multifunctional peroxides would, compared to a polymerization using monofunctional peroxides, make it possible to produce polymers having a higher molecular weight if the same molar amount of initiator were used. On the other hand, increasing the concentration of multifunctional peroxides enables the conversion in the polymerization to be increased and thus the polymerization cycle to be shortened without the molecular weight of the polymer being reduced and the product properties thus being impaired.

EP-A 574 665 describes an initiator combination comprising A. dibenzoyl peroxide which decomposes at 80–90° C. and B. bifunctional perketals, eg. 2,2-bis(tert-butylperoxy)butane and 2,2-bis(tert-butylperoxy)cyclohexane, which decompose at from 105 to 130°. However, such an initiator combination does not enable the above-described effects to be achieved.

JP-A 61-171705 describes a process for producing EPS by polymerization of styrene in the presence of carbon black using a bifunctional peroxide free of benzene rings as initiator. While the polymerization of styrene is inhibited by carbon black particles when using conventional peroxides, thus greatly increasing the polymerization time, this is said not to be the case when using the bifunctional peroxides free of benzene rings. According to JP-A 61-171705, up to 20% by weight of the bifunctional peroxide can be replaced by a monofunctional peroxide which has a half-life period of 10 hours at from 100 to 110° C., for example by tert-butyl peroxyacetate. However, when using such small amounts of peroxides which decompose at high temperatures, the EPS formed in the polymerization has a relatively high residual styrene content which in the examples of JP-A 61 171705 is in each case 1000 ppm or more.

In the suspension polymerization according to the present invention, preference is given to using styrene alone as monomer. However, up to 20% of its weight can be replaced by other ethylenically unsaturated monomers such as alkylstyrenes, divinylbenzene, acrylonitrile, 1,1-diphenylethene or α-methylstyrene.

In the suspension polymerization, the customary auxiliaries such as suspension stabilizers, blowing agents, chain transfer agents, expanding aids, nucleating agents and plasticizers can be added. Particular preference is given to the addition of flame retardants, preferably in amounts of from 0.6 to 6% by weight, and of flame retardant synergists in amounts of from 0.1 to 1% by weight, in each case based on the resulting styrene polymer. Preferred flame retardants are aliphatic, cycloaliphatic and aromatic bromine compounds such as hexabromocyclododecane, pentabromomonochlorocyclohexane and pentabromophenyl allyl ether. Suitable synergists are C-C- or O-O-labile organic compounds such as bicumyl and dicumyl peroxide. Blowing agents are added in amounts of from 3 to 10% by weight, based on monomer. They can be added to the suspension before, during or after the polymerization. Suitable blowing agents are aliphatic hydrocarbons having from 4 to 6 carbon atoms. It is advantageous to use inorganic Pickering dispersants, eg. magnesium pyrophosphate or calcium phosphate, as suspension stabilizers.

According to the invention, the suspension polymerization is carried out in the presence of at least two peroxides which decompose at different temperatures. The peroxide A which decomposes at the lower temperature should have a half-life period of 1 hour at from 80° C. to 100° C., preferably from 85° C. to 95° C.; the peroxide B which decomposes at the higher temperature should have a half-life period of 1 hour at from 110° C. to 150° C., preferably from 120 to 1350° C.

The suspension polymerization is advantageously, as described in EP-A 405 324, carried out in two temperature stages. Here, the suspension is first heated to from 80° C. to 90° C. over a period of about 2 hours, with the peroxide A decomposing and initiating the polymerization. The reaction temperature is then allowed to rise, preferably at 8–17° C. per hour, to from 100 to 130° C. and the temperature is held until the residual monomer content has dropped to less than 1000 ppm. At this temperature, the peroxide B decomposes. This procedure makes it possible to produce EPS having low residual monomer contents.

According to the present invention, the peroxide A is a multifunctional, preferably bifunctional, peroxide. Particular preference is given to 2,5-bis(2-ethylhexanoylperoxy)-2,5-dimethylhexane (TRIGANOX 141 from Akzo) which has a half-life period of 1 hour at 86° C. 1,1-Bis(tert-butyl)-3,3,5-trimethylcyclohexane (TRIGANOX 29) is also suitable. The peroxide A is preferably used in amounts of from 0.01 to 0.2 mol %, in particular from 0.03 to 0.15 mol %, per 1 mol of monomer.

The peroxide B used can in principle be any customary peroxide which decomposes at the abovementioned high temperatures. However, preference is given to peroxides which are free of benzoyl groups if the EPS obtained is to be benzene-free. Preferred peroxides B are therefore dicumyl peroxide having a half-life period of 1 hour at 132° C. and also the aliphatic or cycloaliphatic perketals or monoperoxycarbonates which are mentioned in EP-A 574 665, and tert-butyl peroxyacetate.

The peroxide B is preferably used in amounts of from 0.10 to 0.5 mol %, in particular from 0.16 to 0.30 mol %, based on monomer. The molar ratio of the peroxides B:A or B:(A+A') should be greater than 40:60, preferably greater than 50:50.

In a particular embodiment of the invention, a part, preferably from 20 to 80 mol % and in particular from 30 to 70 mol %, of the multifunctional peroxide A which decomposes at the lower temperature is replaced by a conventional monofunctional peroxide A'. The preferred peroxide A' is dibenzoyl peroxide having a half-life period of 1 hour at 91° C.; tert-butyl peroxy-2-ethylhexanoate, tert-amyl peroxy-2-ethylhexanoate and dilauryl peroxide are also suitable.

The combination of monofunctional and multifunctional peroxides which both decompose in the low temperature range leads to formation of polymers having a bimodal molecular weight distribution. EPS based on such polymers has, on the one hand, good expandability even at a relatively low blowing agent content (which is desirable for environmental reasons) and, on the other hand, the high molecular weight fraction ensures that the product properties of foams produced therefrom are sufficiently good. Varying the amounts of peroxides A and A' enables the molecular weight distribution and thus said properties to be set in a targeted way.

In the suspension polymerization, bead-shaped, essentially round particles having a mean diameter in the range from 0.2 to 2 mm are formed. They can be coated with the customary coating agents, eg. metal stearates, glyceryl esters and finely divided silicates.

The EPS particles can be processed to produce polystyrene foams having densities of from 5 to 100 g/l, preferably from 10 to 50 g/l. For this purpose, the expandable particles are prefoamed. This is usually carried out by heating the particles with steam in prefoamers. The particles which have been prefoamed in this way are then welded together to produce moldings. For this purpose, the prefoamed particles are introduced into molds which do not close so as to be gas tight and are treated with steam. After cooling, the moldings can be removed from the mold.

EXAMPLE 1
(Comparison)

0.81 kg of dibenzoyl peroxide and 2.1 kg of dicumyl peroxide are added to 429 kg of styrene. The organic phase is introduced into 491 l of deionized water in a 1 m³ stirred pressure vessel. The aqueous phase comprises 1.19 kg of sodium pyrophosphate and 2.38 kg of magnesium sulfate heptahydrate. The reaction mixture is, while stirring, heated to 90° C. over a period of 2 hours. It is subsequently heated up to 132° C. over a period of 4 hours, with 5.8 kg of emulsifier K 30/40 (Bayer AG) being added after 1.5 hours and 30 kg of pentane being added after about 2.5 hours. Finally, polymerization is completed at 132° C. for a further 4 hours. This gives beads having a residual styrene content of less than 1000 ppm. The mean molecular weight Mw is 230,000 g/mol.

EXAMPLE 2

2.16 kg (0.12 mol %) of 2,5-bis(2-ethylhexanoylperoxy)-2,5-dimethylhexane and 2.1 kg (0.19 mol %) of dicumyl peroxide are added to 429 kg of styrene. The organic phase is introduced into 491 l of deionized water in a 1 m³ stirred pressure vessel. The aqueous phase comprises 1.19 kg of sodium pyrophosphate and 2.38 kg of magnesium sulfate heptahydrate. The reaction mixture is heated while stirring to 132° C. over a period of 4 hours, with 5.8 kg of emulsifier K 30/40 (Bayer AG) being added after 2.5 hours and 30 kg of pentane being added after about 3.5 hours. Finally, polymerization is completed at 132° C. for a further 4 hours. This gives beads having a residual styrene content of less than 1000 ppm. The mean molecular weight $M_w$ is 230,000 g/mol.

The polymerization cycle was able to be shortened by 2 hours compared to Example 1.

EXAMPLE 3

0.4 kg of dibenzoyl peroxide (0.04 mol %), 0.4 kg of 2,5-bis(2-ethylhexanoylperoxy)-2,5-dimethylhexane (0.02 mol %) and 2.1 kg of dicumyl peroxide (0.19 mol %) are added to 429 kg of styrene. The organic phase is introduced into 491 l of deionized water in a 1 m³ stirred pressure vessel. The aqueous phase comprises 1.19 kg of sodium pyrophosphate and 2.38 kg of magnesium sulfate heptahydrate. The reaction mixture is heated while stirring to 90° C. over a period of 2 hours. It is subsequently heated up to 132° C. over a period of 4 hours, with 5.8 kg of emulsifier K 30/40 (Bayer AG) being added after 1.5 hours and 30 kg of pentane being added after about 2.5 hours. Finally, polymerization is completed at 132° C. for a further 4 hours. This gives beads having a residual styrene content of less than 1000 ppm.

We claim:
1. A process for producing expandable styrene polymers (EPS) in which monomeric styrene is polymerized in aqueous suspension in the presence of at least two organic peroxides, A and B, wherein peroxide A has a half-life period of 1 hour at from 80° C. to 100° C. and peroxide B has a half-life period of 1 hour at from 110° C. to 150° C., further wherein peroxide A decomposes at a lower temperature than peroxide B and is multifunctional; and whereby peroxide A initiates two or linked polymer chains on peroxide B to produce an expanded styrene polymer having a molar ratio B:A of the peroxides greater than 40:60.

2. A process for producing EPS as claimed in claim 1, wherein the peroxide A is 2,5-bis(2-ethylhexanoylperoxy)-2,5-dimethylhexane.

3. A process for producing EPS as claimed in claim 1, wherein part of the multifunctional peroxide A which decomposes at the lower temperature is replaced by a monofunctional peroxide A' which on decomposition forms only one polymer chain.

4. A process for producing EPS as claimed in claim 1, wherein the peroxide B is free of benzoyl groups.

5. A process for producing EPS as claimed in claim 4, wherein the peroxide B is dicumyl peroxide.

6. A process for producing EPS as claimed in claim 1, wherein, based on monomer, from 0.01 to 0.20 mol % of peroxide A and from 0.10 to 0.5 mol % of peroxide B are used.

7. A process for producing EPS as claimed in claim 3, wherein from 20 to 80 mol % of the peroxide A is replaced by the monofunctional peroxide A'.

8. A process for producing expandable styrene polymers (EPS) as claimed in claim 1, wherein the monomeric styrene is provided in a mixture with one or more comonomers, wherein the comonomers comprise up to 20 percent by weight of the styrene.

* * * * *